UNITED STATES PATENT OFFICE.

JOHN K. STEWART, OF CHICAGO, ILLINOIS.

SWIVEL-JOINT FOR SPEEDOMETER-DRIVING CONNECTIONS.

No. 930,431.

Specification of Letters Patent.

Patented Aug. 10, 1909.

Application filed July 5, 1907. Serial No. 382,165.

*To all whom it may concern:*

Be it known that I, JOHN K. STEWART, a citizen of the United States, residing at Chicago, in the county of Cook and State of Illinois, have invented new and useful Improvements in Swivel-Joints for Speedometer-Driving Connections, of which the following is a specification, reference being had to the drawings forming a part thereof.

The purpose of this invention is to provide an improved joint in the power-transmitting devices for actuating a speedometer on a vehicle having in view and adapted to the situation of such devices as being preferably fixedly mounted in some convenient position observable by the operator and as therefore preferably or most conveniently for connection for actuating the speed indicating and recording devices from one of the wheels on the forward axle which is swiveled for steering.

It consists in the elements of construction and combination shown and described as indicated in the claim.

Figure 1:
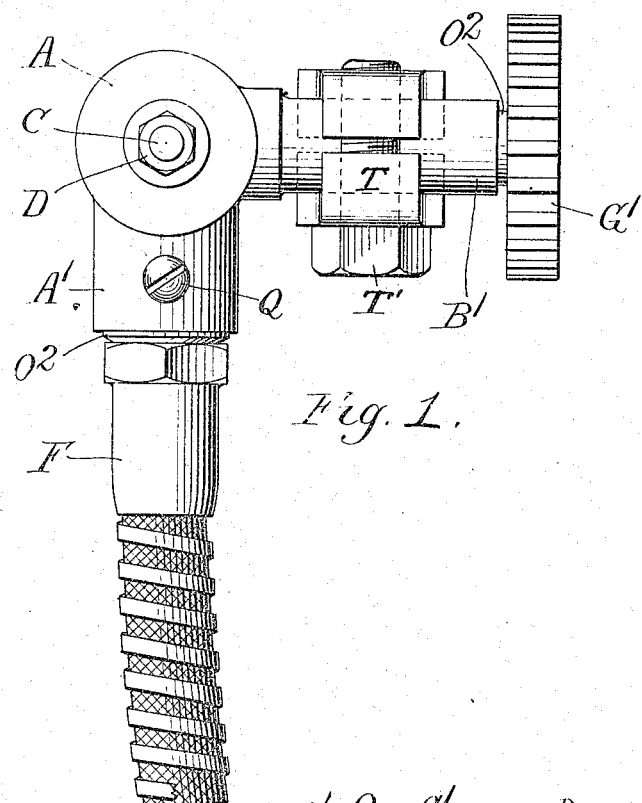
Figure 2:
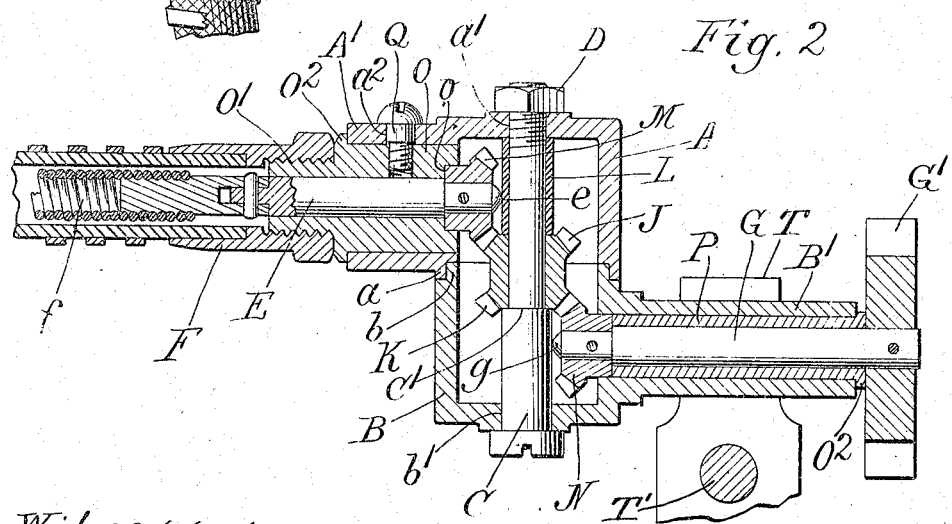

In the drawings:—Figure 1 is an elevation of a device embodying this invention showing the clamp by which it is carried for relating its initial power-receiving pinion to a driving gear (not shown) on the wheel whose speed is to be indicated. Fig. 2 is an axial section through all the shafts of the device.

This joint comprises a two-part case, the two parts, A and B, each comprising one half of a hollow cylinder rabbeted at their junction, as shown at $a$ and $b$, for swiveling one upon the other about the axis of such cylinder. The opposite end of each half of the cylinder is closed except as to the central apertures, $a^1$, $b^1$, which receive the center bolt, C, such bolt being preferably inserted through the aperture in one of said parts and screwed into the aperture in the other part and made secure in said other part by a lock nut, D, on the protruding end of the bolt. The two parts may thus be secured together so as to oscillate freely with respect to each other while nevertheless retained against any longitudinal displacement, their bearing upon each other at their rabbeted ends insuring their axial alinement without regard to the amount of bearing afforded by the central bolt, C.

Each of the parts, A and B, beside the cylindrical rabbeted portion described, has a hollow arm projecting at right angles to the axis of the cylindrical portion. Said arms, $A^1$ and $B^1$, respectively are designed to support bearings for shaft elements at right angles to the axis of the two-part swiveled cylindrical elements. Within the bearing arm, $A^1$, there is journaled a shaft element, E, which projects from the end of said arm for connection with the speedometer (not shown) by any power-transmitting means, as the flexible shaft, $f$, the terminal element, F, of whose casing of familiar construction is shown attached to said arm, $A^1$. Within the bearing arm, $B^1$, of the element, B, there is journaled a shaft, G, protruding from the end of the arm and adapted for operative connection to a wheel, as the pinion, $G^1$; which is provided for meshing with a gear or gear rim (not shown) on the wheel whose speed is to be measured. The shafts, E and G, have on their inner ends respectively within the cylindrical elements, A and B, bevel-gears, M and N; and on the axial bolt, C, there is journaled a double bevel-gear, J—K, its two gear elements, J and K, facing oppositely for meshing respectively with the bevel-gears, M and N. The axial bolt, C, is reduced in diameter from the threaded end for a suitable distance to afford journal bearing for the double bevel-gear, J—K, and the shoulder, $C^1$, to stop said double gear in one direction at the proper position for its engagement with the bevel-gear which it is to drive. For stopping it in the other direction and preventing any tendency to mesh too deeply with the driven gear at that side there is provided a sleeve L, on the reduced portion of the axial bolt, C, of suitable length to be stopped against the inner surface of the head of said element A, when the gear, K, is stopped in one direction against the shoulder, $C^1$, and in the other direction against the inner end of said sleeve, and the gears, N and K, are properly intermeshed.

It will be observed that in order to provide for properly assembling the parts of this device with the gears properly intermeshed there will be a distinct advantage in being able to secure the gears, M and N, to the ends of their respective shafts before the shafts and gears thereon are introduced into the casing, since the access to the hubs of the gears at the point at which they require fastening to their shafts is limited after they are in place in the part of the fitting in which the shafts are journaled; and this will be particularly advantageous in view of the difficulty of disconnecting the gears from the shafts after they are once securely attached, which would make repairs especially difficult. It will also be observable that since the shafts, E and G, are necessarily stopped endwise in one direction by the ends of the hubs of the gears, M and N, it is important to provide smooth shoulders or counter-bores around the bearings of said shafts for the hubs of the gears to stop against, and that the making of such smooth shoulders in the interior of the cylindrical shell would involve some difficulty. The requirements of convenience above indicated are met and the difficulties indicated are avoided by the construction adopted and shown in the drawings, in respect to the bearing of the shaft, E, in which a steel bushing O is provided in the arm, A¹. The outer diameter of such steel bushing, O, is substantially equal to the extreme outer diameter of the pinion, M, to the outer points of its teeth, so that the pinion can be entered through any bore adapted to receive the bushing. The sleeve or arm, A¹, has its axial cavity cylindrical, the diameter of such cavity being such as to receive the sleeve, O, said sleeve being suitably bored axially to afford bearing for the shaft, E, and counter-bored to afford stop shoulders, o, for the hub of the gear, M. Said gear may be secured fast to the end of its shaft, E, before being inserted into the bushing, the bushing carrying the shaft and gear being then inserted into the arm, A¹, to the proper depth to cause the gear, M, to mesh with the member, J, of the gear, J—K. Any convenient means may be employed to secure the bushing in the arm, A¹, at a point at which the gear, M, will be thus properly meshed. The application of the same mode of construction to the bearing of the shaft, G, is obvious.

I prefer to make both the members, A and B, of the shell or case of metal which can be formed by casting in a steel die or mold into which the metal is forced under pressure, or, as it is commonly called, pumped in, and in view of this mode of making the shell, or rather, in view of the character of the metal which will be used when it is made in this manner, I prefer to secure the bushing, O, by means of a threaded pin Q, which takes through a lateral aperture, a², in the arm, A¹, and is screwed into the bushing, O, which is suitably bored and tapped at the right point for that purpose. This method of holding the bushing in position avoids any deficiency of strength which the relatively soft metal of the shell might have for holding a set screw or any other form of fastening requiring engagement of a thread with the soft metal. The bushing, O, of the member from which the driven spindle extends, said spindle being designed for connection with a flexible shaft, as stated, terminates in a threaded boss, O¹, which affords the means of attaching to the shell or case the terminal coupling, F, of the flexible shaft casing.

When employing a case made in the manner described and, of the character of metal which can be thus made,—that is to say, by being forced or pumped into a steel die or mold,—a steel lining or bushing is desirable, even when it is not considered necessary or important to provide for introducing the gear on its spindle through the arm. To meet this necessity the shaft, G, is provided with a steel bushing, P, which is driven into the arm, B¹, of the shell and affords by its inner end the shoulder against which the hub of the bevel-gear, N, stops. In this construction the gear is necessarily applied to the shaft and pinned thereto after the latter is inserted through the bushing.

It will be observed that while the bushings stop the bevel-gears, M and N, against outward movement, there is nothing to stop them against inward movement which might cause them to mesh too deeply with the double bevel-gear, J—K, except the devices which may be connected to the outer ends of the shaft, as, for example, the gear, G¹, whose hub affords a stop in the opposite direction against the outer end of the bushing, P. The flexible shaft attached to the shaft, E, however, does not afford such stop, and it might often be the case that the connection made through the shaft, G, would not be such as to serve the purpose of a stop. I prefer, therefore to stop the shafts, E and G, at their inner ends against the sleeve, L, and the unreduced portion of the bolt, C, and for this purpose the shafts are terminated in a blunt tapered end protruding from the center of the bevel-gears into contact with said sleeve and bolt, as shown at e and g. The bushings, O and P, are preferably formed with flanges, O², which stop against the outer ends of the arms, A¹ and B¹.

The arm, B¹, is shown longer and of less diameter than the arm, A¹, and of less diameter than would be necessary to permit the withdrawal of the gear through it and the employment for that purpose of a suitably large bushing, the advantage of that construction being sacrificed in order to adapt the arm, B, to be held in a clamp, T, provided with a clamping bolt, T¹, so that the whole fitting may be adjustable longitudinally and about the axis of the gear, G¹, and so that an excessively large clamp may be avoided and a reasonably long bearing therein afforded.

I claim:—

A device for the purpose indicated comprising a two-part cylindrical case, the two parts of which are engaged end to end for relative rotation about their common axis, and a bolt extending axially through them for retaining them in engagement, each of said parts having a shaft bearing arm projecting transversely to the axis; a shaft journaled in each of said arms; a bevel-gear on the inner end of each shaft and a double bevel-gear on the axial bolt engaging the bevel-gears on the two shafts, the bolt being reduced in diameter for a distance from one end forming a shoulder, $C^1$, for stopping the double bevel-gear in one direction; a sleeve on the reduced portion of the bolt at the opposite side of the bevel-gear stopped thereagainst and against the inner side of the head of the case member at that side of the double bevel-gear, the shafts being extended through the bevel-gears on them respectively and stopped respectively against the unreduced portion of the bolt and said sleeve.

In testimony whereof, I have hereunto set my hand, in the presence of two witnesses, at Chicago, Illinois, this 29th day of June, 1907.

JOHN K. STEWART.

In the presence of—
M. GERTRUDE ADY,
J. S. ABBOTT.